Patented Aug. 18, 1925.

1,550,537

UNITED STATES PATENT OFFICE.

JOHANNES GÖRBING, OF HAMBURG, GROSSBORSTEL, GERMANY, ASSIGNOR TO THE ZELLSTOFFFABRIK WALDHOF, OF MANNHEIM-WALDHOF, BADEN, GERMANY.

FERTILIZER.

No Drawing.    Application filed April 12, 1922.   Serial No. 551,915.

*To all whom it may concern:*

Be it known that I, JOHANNES GÖRBING, a citizen of Germany, residing at Hamburg, Grossborstel, Germany, have invented certain new and useful Improvements in Fertilizers and the Process of Making the Same; and I do hereby declare the following to be a full, clear, and exact description of the invention, such as will enable others skilled in the art to which it appertains to make and use the same.

My invention relates to improvements in fertilizers and the process of making the same, and more particularly in fertilizers made on the basis of waste liquor from the manufacture of cellulose or waste sulfite liquor. As is known in the art the said liquor has valuable fertilizing properties and it contains substances which are particularly suitable for improving the growth of the bacteria of the soil. However, practically the said liquor can not be used in a concentrated state, because the fertilizer is used only during very limited periods of time, and it is impossible to store the same. To dry the liquor and to use the same in a dry state is not feasible in view of the high cost of drying.

The object of the improvements is to produce a fertilizer of this class in which the organic matter contained in the sulfite liquor is in a form favorable for fertilizing purposes and in the correct combination corresponding to biological conditions. Another object is to bring the valuable organic substances into a form in which they can be stored for any length of time and in which they can be supplied to the consumer at low cost. With these and other objects in view my invention consists in combining the liquor with matter adapted when entering into reaction to combine with the water of the liquor, such as lime, or lime and magnesia, the magnesia being adapted to a certain extent to substitute the lime. I have found that thereby a product is obtained which can be stored and which can be spread by machinery. The quicklime has the property when slaked to bind the water of the liquor, and when used in the correct proportions to transform the extract substances contained in the liquor into a perfectly dry mass which is not viscous and which can be ground, without requiring expensive methods. In the practice of the invention various conditions should prevail which adapt the process to the manufacture of the cellulose and render the process so simple that the cost of the fertilizer is low.

I have found that for obtaining the best results the quicklime should not be slaked in the usual way by means of high grade liquor, because the pieces of lime are covered by a brown, viscous coat, which interferes with a rapid operation. When using diluted liquor, this objection is removed. However, thereby the percentage in organic matter contained in the product is reduced, and the product is comparatively wet. Therefore, the preferred way of carrying out the process consists in using concentrated liquor, and binding and drying the extract substances by working at elevated temperature, by using hot liquor and causing the same to act either on pieces of quicklime, or, preferably, on ground lime. The lime may be brought into the liquor, or the liquor is made to flow into suitable vessels containing the lime. As distinguished from the ordinary slaking process, the reaction takes place slowly, and even if the temperature of the liquor is as high as 100° C. the reaction is not violent. Preferably, the mass is stirred from time to time in order to obtain a loose, non-compact product. To facilitate the stirring I prefer to add peat dust to the ground lime.

The ratio of lime and liquor, or of lime, peat and liquor depends on the content of the liquor in dry matter. For example, 6 parts of a certain liquor of 32° Bé. at a temperature of from 60 to 70° C. can be dried by means of one part of lime. If the ratio of lime and extract approaches the correct one, a mass adapted to be rubbed or to disintegrate by itself is readily obtained. For example, a liquor of 36° Bé. can be transformed by 1 or ½ part of quicklime into a mass which is perfectly dry and powdery, or which can readily be rubbed. Preferably the process is carried out at comparatively high temperature, if a high grade liquor is treated, because by the reduction of the viscosity at elevated temperature the liquor is more readily bound to the lime.

In such cases, in which there is a lack of other fertilizing substances necessary for the growth of the bacteria, I prefer to add small amounts of suitable fertilizing substances or mixtures thereof, such as phosphates, potassium salts, nitre in any preferred form, and the like, which substances are added either in the course of the manufacture of the raw product, or when grinding the same.

I claim:

1. The herein described process of making a dry fertilizer, which consists in causing a reaction of waste liquor from the manufacture of cellulose and quicklime to thereby bind or absorb substantially the whole of the water of the liquor.

2. The herein described process of making a dry fertilizer, which consists in causing a reaction of waste liquor from the manufacture of cellulose and quicklime and magnesia to thereby bind or absorb substantially the whole of the water of the liquor.

3. The herein described process of making a dry fertilizer, which consists in causing a reaction of concentrated waste liquor from the manufacture of cellulose and quicklime to thereby bind or absorb substantially the whole of the water of the liquor.

4. The herein described process of making a dry fertilizer, which consists in mixing waste liquor of the manufacture of cellulose with a distributor of reaction such as peat, and causing a reaction of the said liquor and quicklime to thereby bind or absorb substantially the whole of the water of the liquor.

5. The herein described process of making a dry fertilizer, which consists in causing a reaction of waste liquor from the manufacture of cellulose and quicklime to thereby bind or absorb substantially the whole of the water of the liquor, and adding fertilizing media during the reaction.

6. The herein described process of making a dry fertilizer, which consists in causing a reaction at elevated temperature of waste liquor from the manufacture of cellulose and quicklime to thereby bind or absorb substantially the whole of the water of the liquor.

7. The herein described process of making a dry fertilizer, which consists in causing a reaction of waste liquor from the manufacture of cellulose and powdered quicklime to thereby bind or absorb substantially the whole of the water of the liquor.

8. The herein described dry fertilizer, which contains the fertilizing matter of the waste liquor of the manufacture of cellulose and lime, and which is produced by causing a reaction of the said liquor and quicklime to thereby bind or absorb substantially the whole of the water of the liquor.

9. The herein described dry fertilizer, which contains the fertilizing matter of the waste liquor of the manufacture of cellulose, lime and magnesia, and which is produced by causing a reaction of the said liquor, quicklime and magnesia to thereby bind or absorb substantially the whole of the water of the liquor.

10. The herein described dry fertilizer, which contains peat, the fertilizing matter of the waste liquor of the manufacture of cellulose and lime, and which is produced by mixing the said liquor with peat, and causing a reaction of the liquor and quicklime to thereby bind or absorb substantially the whole of the water of the liquor.

In testimony whereof I hereunto affix my signature.

JOHANNES GÖRBING.